April 6, 1937.    D. L. DOHERTY ET AL    2,076,139
MEAT TENDERER
Filed April 13, 1935
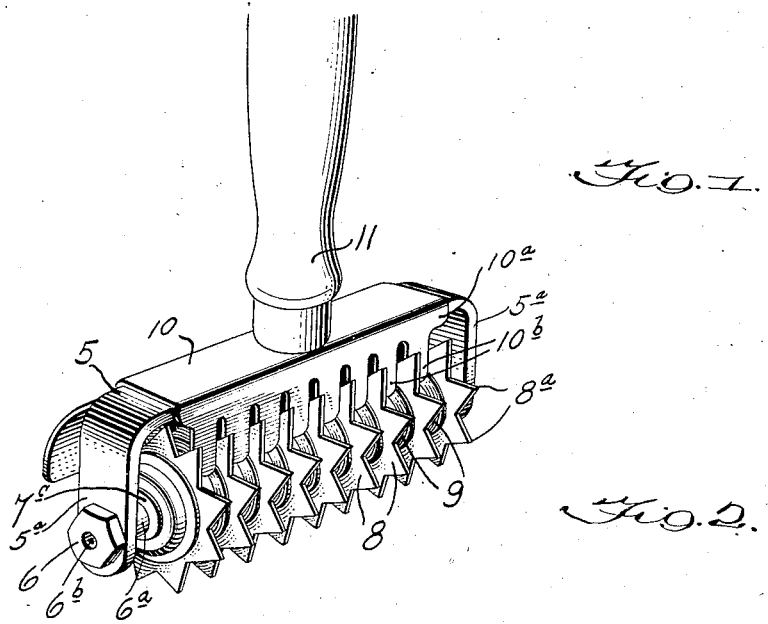
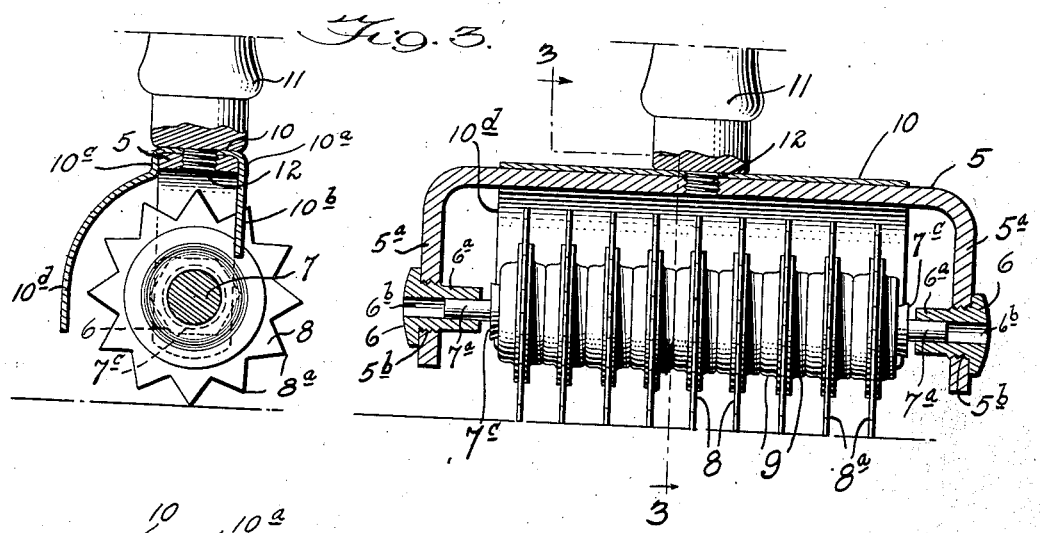
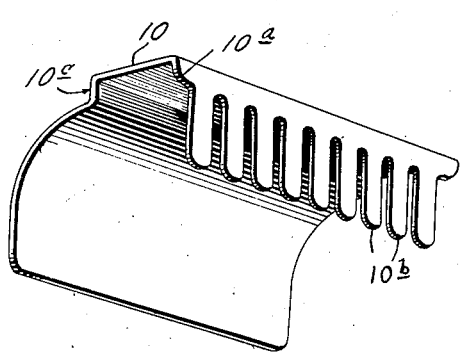
Inventors
D. L. Doherty,
David G. Rose,
By Miles B. Stevens & Co.
their Attorneys Patented Apr. 6, 1937

2,076,139

UNITED STATES PATENT OFFICE 2,076,139

MEAT TENDERER

David L. Doherty and David G. Rose, Louisville, Ky.; said Doherty assignor to said Rose Application April 13, 1935, Serial No. 16,248

12 Claims. (Cl. 17—29)

Our invention relates to devices for operating upon cuts of meats such as steaks, liver, chops, ham and the like, for rendering same more easily masticated and digested, and which are commonly known in the art as meat tenderers.

Briefly stated, the invention has among its objects to provide an implement of this class incorporating a combined guard and stripper member adjacent the blade which not only protects the hand of the operator and enables him to exert direct downward pressure upon the meat when the device is in use, but also strips from the blade particles of meat which would otherwise be carried around on the blade and interfere with the proper operation of same.

The invention also contemplates a novel guard attachment for meat tenderers which may be readily removed for cleaning purposes, novel means being employed for holding the guard in place.

Still another object of the invention is to provide in a device of the character set forth, a novel knife assembly and mounting means therefor which may be readily separated from one another for cleaning purposes; and the invention further contemplates novel means for securing the blades in rigid laterally spaced assembly upon a carrier bar or the like.

Various other objects and advantages of the invention will become apparent in the course of the following description, read in connection with the accompanying drawing forming a part of this application.

In the drawing, wherein like reference characters have been used to designate similar parts throughout the several views:—

Figure 1 is a perspective view of a meat tenderer incorporating our invention;

Figure 2 is a longitudinal sectional view through the same, and illustrating the means for removably supporting the knife assembly in operative position;

Figure 3 is a cross-sectional view taken on the line 3—3 of Figure 2;

Figure 4 is a perspective view of the novel guard and stripper member.

It is to be understood that the drawing illustrates what now appears to be a preferred form of the invention. However, obviously, various changes may be made in the structure disclosed without departing from the spirit and scope of the subject matter as claimed hereinafter.

Referring to the drawing by reference characters, numeral 5 denotes a U-shaped carrier frame for the knife assembly, there being shown opposed arms 5a provided with opposed tapped apertures 5b for receiving the headed nuts 6 having the sleeve extension 6a extending inwardly of the arms 5a to receive the pintles 7a of the carrier shaft 7, the nuts 6 being shown as provided with bores 6b for receiving such pintles 7a.

It will be apparent that the knife or blade assembly can be readily removed for cleaning purposes by simply partially unscrewing the nuts 6 from the recesses 5b in which they are seated.

Numeral 8 indicates the disc-like blades provided with the peripheral prongs 8a of which there are twelve on each blade as shown, although of course any number of prongs may be used within the spirit and scope of the invention.

As best shown in Figure 2 the blades 8 are assembled on the shaft 7 in spaced relationship, there being provided between each pair of blades a pair of spacer members 9 which preferably take the form of spring metal cups arranged with their open portions disposed in opposite directions and bearing against the adjacent blades 8. The blades and cups are assembled somewhat loosely upon the shaft 7, whereupon the ends of the shaft are subjected to the action of a riveting machine or analogous device which produces an outward bulge 7c at each end of the shaft, so as to in effect shorten same and press the knife and cup assembly 8, 9 into a substantially unitary mass so that the entire knife assembly 7, 8, 9 will turn as a unit with the pintles 7a as journals. The production of the rivet ends 7c of the shaft 7 inwardly of the pintles 7a tends to compress the cup-like spacers 9 to firmly grip the blades 8. Of course, other ways may be employed of obtaining rigid mounting of the blade 8 on the shaft 7, but the foregoing is the now preferred method of doing so.

Coming now to the novel stripper and guard member, numeral 10 denotes the bight or seating portion thereof having the side flanges 10a, 10c which are adapted to engage the opposite side of the bight portion of the carrier frame 5 as best shown in Figure 3. Depending from the side flange 10a are the stripper fingers 10b which engage or very nearly engage the sides of adjacent blades 8 and are preferably of a length and form to make angular engagement with or to terminate just short of the periphery of the pair of spacer members 9 between a particular set of blades 8 so as to not only prevent meat from clinging to the sides of the blades 8, but also to prevent meat from clinging to the spacer members 9. The fingers 10b therefore tend to keep the knives and spacers clean, so that the device will not clog and will be easy to keep clean.

The side flange 10c carries the arched guard 10d which extends over the peripheries of the knives and provides a support for the hand of the operator when the device is in use; also, a guard for the blade to prevent injury of same when the device is not in use.

The combined stripper and guard member 10 is held seated upon the bight portion of the carrier member 5 by means of the operating handle 11 of the device, which has the machine screw 12 in its end which is adapted to extend through a hole in the member 10 and into the bight portion of the carrier member 5 which has the screw hole for receiving the threads of the screw 12.

The knives 8 are preferably of the best grade of fire hardened and tempered steel so that they will retain their edge. The carrier frame 5 and the blade spacers 9 will preferably be nickeled, and the same as to the bearing nuts 6 and pintle ends of shaft 7, 7a. The guard and stripper member 10, etc., will likewise be nickeled. Rolled steel or aluminum and probably other materials can be used to advantage.

In operation, the operator will probably grasp the handle 11 with his right hand and place his left hand upon the guard 10d, rolling the blade assembly back and forth over the particular cut of meat which it is desired to render more tender. The guard 10d protects the operator's hand while the fingers 10b strip from the blade any particles of meat which would otherwise cling thereto and be carried around. The fingers 10b also provide what might be termed a guage for limiting the depth of penetration of the blades or prongs 8a of the blade into the meat. When the guard and stripper fingers are to be removed, it is only necessary to unscrew the handle 11. When the blade assembly is to be removed for cleaning, all that is necessary is to unscrew the nuts 6 sufficiently to admit of removal of the pintles 7a from the bores 6b.

Having thus described our invention, we claim as new:

1. A meat tenderer comprising in combination a rotary knife assembly providing laterally spaced blades, a carrier for said rotary knife assembly, a detachable handle for said carrier, a member removably seatable on said carrier and held in place by said handle, said member providing a hand shield portion projecting laterally from one side and overlying the blade assembly, and stripper fingers projecting laterally from the other side of said member and disposed between adjacent ones of said blades for stripping meat therefrom.

2. A meat tenderer comprising in combination, a rotary knife assembly providing laterally spaced blades, a carrier for said rotary knife assembly, said knife assembly and carrier having cooperating securing means, a member removably secured to said carrier and providing a hand shield portion projecting laterally from one side and overlying the blade assembly, and stripper fingers projecting laterally from the other side of said member and disposed between adjacent ones of said blades for stripping meat therefrom.

3. In a meat tenderer comprising a knife assembly including spaced rotary knives and a carrier therefor; the combination of a combined guard and stripper member mounted on said carrier and providing a hand guard overlying the knives at one side of said carrier, stripping means cooperating with the knives at the other side of said carrier, and means associated with said carrier and independent of said knife assembly for securing the combined guard and stripper member to said carrier.

4. In a meat tenderer comprising spaced rotary knives and carrier therefor, there being means holding said knives and carrier assembled; the combination of a combined guard and stripper member mounted on said carrier and providing a hand guard overlying the knives at one side of said carrier, stripping means cooperating with the knives on the opposite side of said carrier, and securing means for said combined guard and stripper member independent of the aforementioned holding means.

5. In a meat tenderer comprising spaced rotary knives and a carrier therefor; the combination of a combined guard and stripper member mounted on said carrier at the exterior upper side thereof and providing a hand guard overlying the knives at one side of said carrier and stripping means cooperating with the knives, an operating handle for said carrier, and means in part carried by said handle and arranged to secure said handle and combined guard and stripper device to said carrier.

6. In a meat tenderer, a combined guard and stripper device comprising a longitudinal seat adapted to seat a knife assembly carrier, an arched shield extending laterally from one side of said seat to overlie knives, and laterally spaced stripper fingers extending from the opposite side of said seat and adapted to cooperatively engage adjacent knives.

7. In a meat tenderer, a knife assembly comprising a knife supporting bar, knife disks on said bar, a pair of oppositely acting spring metal spacers between adjacent ones of said knives, means adjacent one end of said bar for maintaining said knives and spacers thereon and a riveted shoulder enlargement adjacent the other end of said bar for compressing said knives and spacers into an operative assembly.

8. In a meat tenderer, a knife assembly and mounting therefor providing pintle ends, a carrier frame providing opposed bearing portions, removable seats for said pintle ends carried in said opposed bearing portions, a guard member extending from one side of said frame and overlying the knives of said assembly, and laterally spaced stripper fingers extending from the opposite side of said frame between adjacent knives of said assembly.

9. In a meat tenderer, a knife assembly, a carrier frame, means for mounting said assembly in said frame, a guard member extending from one side of said frame and overlying the knives of said assembly, and laterally spaced stripper fingers comprising integral extensions of said guard member extending from the opposite side of said frame between adjacent knives of said assembly.

10. In a meat tenderer, a knife assembly comprising a knife supporting bar, knife discs on said bar, resilient metal spacer members between adjacent knives, each of said spacer members having a central dished portion and having edge portions thereof flanged to provide flat surfaces adapted to bear against an adjacent knife, means adjacent the one end of said bar for maintaining said knives and spacers thereon, and an enlargement formed on said bar adjacent the other end thereof for compressing said knives and spacers into an operative assembly.

11. In a meat tenderer, a knife assembly comprising a knife supporting bar, rotary knives on said bar, resilient metal spacer members between adjacent knives, each of said spacer members having a central dished portion and having edge portions thereof flanged to provide flat surfaces adapted to bear against an adjacent knife, and said bar having means integral therewith compressing said knives and spacers axially into an operative assembly.

12. In a meat tenderer, a knife assembly comprising a knife supporting bar, rotary knives on said bar, resilient metal spacer members between adjacent knives, each of said spacer members having a central dished portion and having edge portions thereof flanged to provide flat surfaces adapted to bear against an adjacent knife, and portions of said bar adjacent the ends thereof being enlarged and said knives and spacers being compressed into an operative assembly between said enlargements.

DAVID G. ROSE.
DAVID L. DOHERTY.